United States Patent [19]

Balevski et al.

[11] 3,960,996
[45] June 1, 1976

[54] METHOD OF INJECTION MOLDING A THERMOPLASTIC ARTICLE HAVING A CELLULAR CORE AND INTEGRAL SKIN INVOLVING USE OF RECLAIMED MATERIAL

[75] Inventors: Anguel Tonchev Balevski; Ivan Dimov Nikolov; Asparuh Mihailov Antonov; Stefan Georgiev Semerdjiev, all of Sofia, Bulgaria

[73] Assignee: Institut po Metaloznanie i Technologia na Metalite, Sofia, Bulgaria

[22] Filed: Sept. 21, 1973

[21] Appl. No.: 399,512

[52] U.S. Cl. ................................. 264/37; 264/45.5; 264/328; 264/329; 264/DIG. 14; 264/DIG. 83; 425/244; 428/322; 428/409
[51] Int. Cl.² ..................... B29D 27/00; B29F 1/04
[58] Field of Search ................... 264/45, 48, 51, 53, 264/54, DIG. 83, 328, 329, DIG. 14, 45.5, 37; 428/322, 409

[56] References Cited
UNITED STATES PATENTS

| | | |
|---|---|---|
| 3,218,375 | 11/1965 | Hardwick .................. 264/DIG. 83 |
| 3,268,635 | 8/1966 | Kraus et al. ................ 264/DIG. 83 |
| 3,694,529 | 9/1972 | Josephsen et al. .......... 264/DIG. 83 |
| 3,751,534 | 8/1973 | Oxley ........................ 264/DIG. 83 |
| 3,773,873 | 11/1973 | Spaak et al. ..................... 264/48 X |

*Primary Examiner*—Philip Anderson
*Attorney, Agent, or Firm*—Karl F. Ross; Herbert Dubno

[57] ABSTRACT

A method of and apparatus for the molding of foamed thermoplastic bodies with integral skins wherein, for each mold operation after the first, a portion of previously foamed material produced by expansion in the mold cavity, is temporarily accumulated behind a body of unfoamed thermoplastic and the foamed and unfoamed material are then forced into the mold cavity and permitted to expand therein.

2 Claims, 1 Drawing Figure

U.S. Patent  June 1, 1976  3,960,996
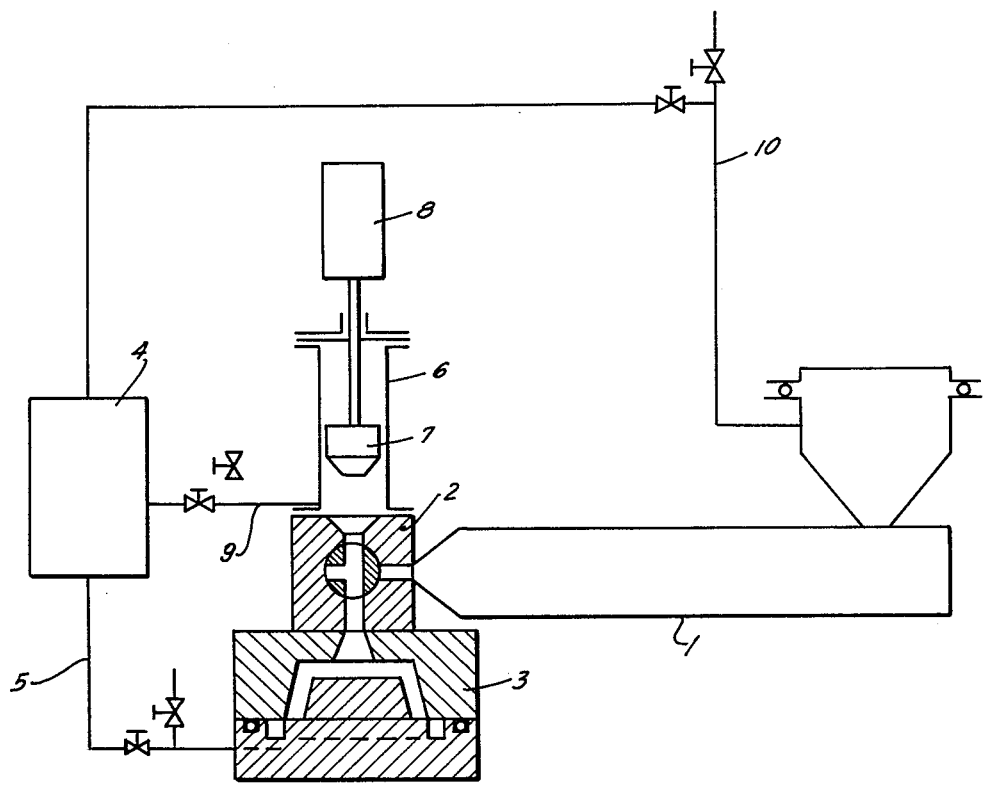

ular) position of the cylinder 6.

METHOD OF INJECTION MOLDING A THERMOPLASTIC ARTICLE HAVING A CELLULAR CORE AND INTEGRAL SKIN INVOLVING USE OF RECLAIMED MATERIAL

This invention relates to a method for the production of thermoplastic mouldings with an integral solid skin and a cellular core, as well as to an apparatus for carrying out this method.

BACKGROUND OF THE INVENTION

Such products are produced by moulding thermoplastic resins, to which a blowing agent has been added. The pressure in the extruder of the injection moulding machine is maintained high enough to prevent any foaming due to dissociation of the blowing agent during the plastification of the molding material.

When the plastified material enters the mold, the blowing agent is decomposed and/or evaporated, forming a gas phase which is distributed as bubbles in the interior of the molded body, while a compact skin is formed on its surface.

Several methods for the production of such molded bodies are known. In one of them, a fixed portion of molten material is "shot" into the mold. This portion is about 50 to 90 percent of the volume of the mold cavity, depending on the desired grade of porosity. The cavity is then totally filled as a result of foaming. It is a drawback of this method, that, regardless of the speed of injecting the material into the mold, the surface of the molded bodies obtained is rough. This is due to the surface bubbles, however small they may be, which are formed immediately after opening the sprue channel towards the mold, and are located along the front of the melt entering the mold.

In another method the mold is filled initially totally with plastified material. After the formation of a compact skin, the mold is opened to a predetermined distance, providing thus an additional volume needed for foaming. Without avoiding the shortcomings of the first method, this technique can find a limited application only for components with a shape permitting the construction of such a mold.

The shortcomings of these methods can be avoided by using the socalled gas counter-pressure method. In this method a gas pressure, referred to as counter-pressure, is produced in the mold before the melt has been introduced into it. The melt enters the mold overcoming this pressure, until it fills it totally. The pressure is released after the formation of a solid skin, so as to provide conditions enabling foaming of the thermoplastic in the interior of the molding mass. The excess expanded material agresses through the sprue. It is thus possible to obtain smooth surfaces and to control the processes of skin formation and foaming.

One such method is known in which the excess expanded material is returned to the front zone of the extruder barrel, to be used in the subsequent injection. However, it is obvious that the retraction of the injection screw for providing the space needed for the excess core foam, will inevitably cause a drop of the pressure in the extruder barrel, which will result in foaming of all of the material contained in this barrel. In the subsequent injection this foamed material will be the first to enter the mold and the result will be an impairment of the quality of the skin. This is an important shortcoming, since laboratory trials have shown that, if premature foaming occurs, further increases in melt pressure will not result in a complete solution of the gas into the melt. A further shortcoming of this method is the complicated mold construction which requires channels in which pistons, driven by hydraulic units, move.

SUMMARY OF THE INVENTION

It is a general object of the present invention to avoid the drawbacks of the known methods, and in particular in the use of the gas counter-pressure method, to avoid the ejection of excess foamed material. Accordingly, an object of the invention is to utilize the excess foamed core material from one molding operation in the next molding without, however, impairing the quality of the skin of the latter.

According to the present invention this is attained as follows. Each molding operation, after the first, fills 50 to 90 percent of the volume of the mold cavity with plastified unfoamed material, while the remaining volume to 100 percent is filled with foamed material from the core of the previous molding operation. After the formation of a solid skin the pressure is released, which results in foaming in the interior of the molding mass the excess foamed material egresses into a closed chamber, from which it is returned to the mold for filling it up at the end of the next molding cycle.

BRIEF DESCRIPTION OF THE DRAWING

This invention may be better understood with reference to the accompanying drawing, the sole FIGURE of which is a schematic sectional diagram of a device embodying the invention.

SPECIFIC DESCRIPTION

For the reason of simplicity, all heating, cooling and other known systems, the need of which is obvious, are not shown in the drawing.

The plastic material, premixed with the necessary quantity of blowing agent, is plastified in the extruder 1. The first molding operations introduces the melt through the distributor (valve) 2 into the mold 3 until the latter is totally filled; the distributor (valve) is in such position, that the extruder 1 and the mold 3 are connected. In the mold 3, which is hermetically closed, a gas pressure is been produced in advance with pressurized gas from the reservoir 4 through a system of pipes and valves 5. After the formation of a solid skin of the desired thickness, the gas pressure is released and the distributor 2 is switched into a position, that the mold is connected with a closed chamber, which in this particular case is a cylinder 6. By lifting the piston 7, a volume is created in the cylinder (if necessary also a vacuum) whereby the excess material is displaced in order to provide conditions for expansion and the formation of a cellular core. The motion of the piston 7 is effected by a known driving mechanism 8. In another position of the distributor 2, the sprue channel to the mold is closed and the solidified molded bodies can be removed from mold 3, while the extruder 1 is connected to the lateral cylinder 6 in which, by means of piston 7, the pressure has been increased so as to compress the foamed material and to prevent any further foaming. The fresh melt from the extruder pushes upwards the foamed material from the previous molding together with the piston 7. This is achieved as a result of the considerable difference in the relative weights, the appropriate design and the vertical (or nearly vertical) position of cylinder 6 over the distributor 2. When enough material for filling totally the mold is accumulated in cylinder 6, the distributor 2 is switched to connect cylinder 6 with the mold 3, which has already been filled with pressurized gas. When the pressure is increased by means of the piston 7, the melt is introduced into the mold in such a way, that initially the fresh nonexpanded material from the bottom part of the cylinder 6 enters the mold and at the end of the process the mold is filled with compressed foamed material from the previous molding, which is immediately below the head of the piston. This latter material fills only the gating system and a portion of the interior of the mold, without impairing the surface of the molded body. After the formation of the skin and the release of the pressure to provide for foaming of the core, part of this foamed material egresses anew from the mold 3 back into the cylinder 6, and then the whole process is repeated.

It is apparent, that nonexpanded material from the extruder 1 can be introduced directly into the mold 3 until it fills 50 to 90 percent of its volume, and then the mold is filled up with foamed material from the cylinder 6, which in this case is used to accumulate and return to the mold the repeatedly processed foamed material.

After a repeated use of one and the same material for filling up the mold 3 and its return back into cylinder 6, it will possibly separate gravitationally in a gas bubble and a compact melt. Usually this will not hinder its further use. However, if in the case of some molded bodies, their shape doesn't allow that they be filled up with a gas bubble, the lateral cylinder 6 can be blown through after a number of molding operations and then a molded body will be produced entirely from fresh material. It is obvious, that in these cases the loss of material will be small.

In many cases, when the molded bodies are of a simple shape, it is possible to fill up 10 to 50 percent of the mold cavity volume by introducing pressurized gas from the cylinder 6 in the interior of the molding, which, after the formation of the skin, is returned, allowing the expansion of the melt. For this purpose cylinder 6 is provided with a separate connection to the pressurized-gas reservoir 4 and the ambient atmosphere by means of a system of pipes and valves 9.

To avoid any danger of bubble formation due to premature foaming during the plastification of the plastic material and to provide for the use of any type of blowing agent, the extruder 1 itself can also be appropriately closed by a hermetic cover or in a hermetic enclosure, which is provided with a separate connection 10 to the pressurized-gas reservoir 4 and the ambient atmosphere.

What we claim is:

1. A method of producing thermoplastic bodies with a cellular core and an integral skin, comprising the steps of:

a. forcing a plasticated foamable non-expanded thermoplastic material in a liquid state into a vertical cylinder at a pressure sufficiently high to prevent foaming;
   b. then injecting said foamable non-expanded thermoplastic material in a liquid state into a closed mold cavity against a gas counter-pressure sufficiently high to prevent foaming;
   c. allowing a surface portion only of said foamable non-expanded thermoplastic material injected in step (b) to solidify under pressure so as to take on the shape of said mold cavity and form a compact skin;
   d. relieving the pressure from said foamable thermoplastic material subsequent to step (c) so as to allow the foaming of the still unsolidified remainder of said material in the interior of the mold cavity, releasing an excess of the foaming material out of said mold cavity into said vertical cylinder, and thereby completing the formation of a molded body in said mold cavity;
   e. removing the molded body from said mold cavity;
   f. recompressing said excess foamed material within said vertical cylinder for use as a second charge in a next subsequent molding cycle;
   g. forcing a further quantity of plasticated foamable but non-expanded thermoplastic material into said vertical cylinder against the recompressed material of step (f) at a pressure sufficiently high to prevent foaming;
   h. injecting the material stored in said vertical cylinder into said closed mold cavity against a gas counterpressure sufficiently high to prevent foaming by first introducing into the mold cavity fresh non-expanded material from the lower part of the vertical cylinder and finally filling the mold cavity with the recompressed foamed material from the previous molding and as stored in the upper part of the vertical cylinder, the latter filling only part of the interior of the molded body causing no damage to its surface;
   i. repeating the steps from (c) to (h) to produce a succession of molded bodies, said mold cavity being charged with 50 to 90 percent of its volume with plasticated unfoamed thermoplastic material for each of said bodies, the remainder of the volume of said mold cavity being filled up with recompressed excess foamed material from the previous molded body.

2. A method as defined in claim 1, wherein the mold cavity is being charged with 50 to 90 % of its volume with plasticated unfoamed thermoplastic material for each of the molded bodies directly from the plastifying unit, the remainder of the volume of said mold cavity being filled up with recompressed excess foamed material from the previous molded body, stored in the vertical cylinder.

* * * * *